United States Patent
Chiu et al.

[19]

[11] Patent Number: 6,156,085
[45] Date of Patent: *Dec. 5, 2000

[54] FILTER AIR CLEANER

[75] Inventors: Bernard Chiu, Wellesley, Mass.;
Stephen Gatchell, Warwick, R.I.;
Jui-Shang Wang, Taipei, Taiwan

[73] Assignee: Honeywell Consumer Products, Inc., Southborough, Mass.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/054,823

[22] Filed: Apr. 3, 1998

Related U.S. Application Data

[63] Continuation of application No. 08/485,656, Jun. 7, 1995, Pat. No. 5,753,000, which is a continuation of application No. 08/110,544, Aug. 23, 1993, abandoned.

[51] Int. Cl.[7] ............................................. B01D 46/00
[52] U.S. Cl. ............................ 55/357; 55/472; 55/498; 55/510
[58] Field of Search ............................. 55/337, 356, 357, 55/359, 385.2, 385.4, 467, 471, 472, 498, 500, 503, 510, 521, DIG. 3

[56] References Cited

U.S. PATENT DOCUMENTS

| | | |
|---|---|---|
| 2,242,278 | 5/1941 | Yonkers, Jr. . |
| 2,394,923 | 2/1946 | Little . |
| 2,889,007 | 6/1959 | Lunde . |
| 2,983,432 | 5/1961 | Tupper . |
| 3,299,620 | 1/1967 | Hollingworth . |
| 3,597,902 | 8/1971 | Williams ................................... 55/467 |
| 3,850,598 | 11/1974 | Boehm . |
| 4,072,483 | 2/1978 | Doyle, Jr. ................................... 55/467 |
| 4,121,916 | 10/1978 | Fricke . |
| 4,129,426 | 12/1978 | Furasen ................................... 55/472 |

(List continued on next page.)

FOREIGN PATENT DOCUMENTS

| | | |
|---|---|---|
| 524095 | 5/1931 | Germany . |
| 615359 | 7/1935 | Germany . |
| 1454637 | 3/1969 | Germany . |
| 40-28545 | 9/1965 | Japan . |
| 42-10040 | 5/1967 | Japan . |
| 55-111528 | 8/1980 | Japan . |
| 59-74826 | 5/1984 | Japan . |
| 1168315 | 7/1989 | Japan ....................................... 55/467 |
| 252019 | 2/1990 | Japan ....................................... 55/471 |
| 2107309 | 4/1990 | Japan ....................................... 55/471 |
| 2-187114 | 7/1990 | Japan ....................................... 55/471 |
| 4-341314 | 11/1992 | Japan . |

OTHER PUBLICATIONS

Advertisements for Pollenex air cleaners bearing copyright date of 1992; Instructions And Warranty for Pollenex Health Aire® bearing copyright date of 1992; Instructions And Warranty for Pollenex Refresh–Aire® bearing copyright date of 1993; Advertisements for Kleen–Rite, Inc.'s Immacul–aire® air cleaner bearing copyright dates of 1982, 1983, and 1986; and Kleen–Rite Installation–Service–Parts Manual for Immacul–air® device; Owner's Manual and Operating Instructions for Vaportek's AP–30 Air Cleaner; and photographs of Vaportek's Nature Fresh™ Air Purifier.

*Primary Examiner*—C. Scott Bushey
*Attorney, Agent, or Firm*—Morgan & Finnegan, LLP

[57] ABSTRACT

A portable air cleaner comprising a cylindrical filter element mounted on a circular base and encased by a cylindrical cover. A centrifugal fan mounted within the cover draws unpurified air into inlet openings disposed in the base and the side wall of the cover, and through the filter element. The resulting purified air is drawn into the centrifugal fan and forced radially outward therefrom. An air deflector dish redirects the purified air through the exhaust openings disposed on the top surface of the cylindrical cover. Such an exhaust flow which is perpendicular to and spaced from the inlet flow results in an improved efficiency in purifying the entire volume of air within a room.

22 Claims, 8 Drawing Sheets

U.S. PATENT DOCUMENTS

| | | |
|---|---|---|
| 4,210,429 | 7/1980 | Goldstein . |
| 4,236,902 | 12/1980 | Fricke . |
| 4,272,261 | 6/1981 | Lynch, Jr. et al. . |
| 4,370,155 | 1/1983 | Armbruster . |
| 4,377,399 | 3/1983 | Bryson . |
| 4,385,911 | 5/1983 | Popeil et al. ............ 55/472 |
| 4,477,270 | 10/1984 | Tauch . |
| 4,526,592 | 7/1985 | Armbruster ............ 55/472 |
| 4,531,956 | 7/1985 | Howorth ............ 55/356 |
| 4,560,395 | 12/1985 | Davis . |
| 4,580,582 | 4/1986 | Grube et al. ............ 131/231 |
| 4,627,862 | 12/1986 | Frei et al. ............ 55/467 |
| 4,629,482 | 12/1986 | Davis ............ 55/471 |
| 4,726,825 | 2/1988 | Natale ............ 55/467 |
| 4,905,340 | 3/1990 | Gutschmit ............ 55/467 |
| 5,096,472 | 3/1992 | Perry ............ 55/467 |
| 5,102,435 | 4/1992 | Rau et al. ............ 55/467 |
| 5,139,546 | 8/1992 | Novobilski ............ 55/471 |
| 5,435,817 | 7/1995 | Davis ............ 55/472 |
| 5,753,000 | 5/1998 | Chiu et al. ............ 55/357 |

FILTER AIR CLEANER

This is a continuation of application Ser. No. 08/485,656 filed Jun. 7, 1995, now U.S. Pat. No. 5,753,000, which is a continuation of 08/110,544 filed Aug. 23, 1993, now abandoned.

BACKGROUND OF THE INVENTION

The invention relates to portable air cleaners for use in removing smoke, dust, pollen, bacteria and other particulate matter from the air through the use of filter elements such as high efficiency particulate air (HEPA) filters. A HEPA filter, by definition, has a 99.97% minimum efficiency of removing airborne particulates of a size of 0.3 microns or larger.

Portable HEPA filter air cleaners are known. For instance, U.S. Pat. No. 4,629,482 granted to G. B. Davis on Dec. 16, 1986 discloses a portable air purification apparatus which employs a cylindrical HEPA filter, which is mounted between a base and a cover, and a centrifugal fan disposed in the base to produce a purified air flow. In operation, the centrifugal fan draws unpurified air through the exposed wall of the cylindrical HEPA filter. The resulting purified air is then radially directed by the centrifugal fan through radially disposed exhaust openings in the base. Davis U.S. Pat. No. 4,629,482 further discloses that it is critical that the radially disposed exhaust openings be horizontally aligned with the centrifugal fan blades so as to produce a nonturbulent exhaust flow which is said to pulsate when the inlet flow is reduced below a certain level due to a clogged HEPA filter. This pulsation of the exhaust air flow is intended to alert the user to replace the HEPA filter.

The configuration of HEPA filter air cleaners wherein the inlet openings and the exhaust openings are both radially disposed has several significant drawbacks. First, given the proximity of the exhaust openings to the inlet openings, a portion of the exhausted purified air will be immediately recirculated back into the air cleaner. This flow pattern results in a reduced efficiency of room air purification, i.e., reduced number of complete room air changes. Second, exhaust flow through exhaust openings that are radially disposed in the lower base portion of the air cleaner may cause particulates on the flooring on which the portable air cleaner is placed, for example, carpeting, to be dispersed into the air thereby temporarily worsening the condition of the air within the room. Third, exhaust flow through radially disposed openings impinge on objects in the room, such as furniture, thereby reducing the dispersal of purified air throughout the room. The radially disposed exhaust flow also directly blows on people relatively near the air cleaner. Obviously, such direct blowing can be annoying and may lead the user to employ the air cleaner only sparingly.

Accordingly, it is an object of the present invention to provide an air cleaner having an exhaust flowpath that results in an improved efficiency of room air purification and a more thorough dispersal of purified air.

Another object of the present invention is to reduce noise levels during air cleaner operation.

SUMMARY OF THE INVENTION

The air cleaner of the invention comprises a cylindrical filter element that is mounted on a base and encased by a removable cylindrical cover. Air inlet openings are radially disposed in the circular base and/or along the periphery of the cylindrical cover. Exhaust openings are disposed perpendicular to the air inlet openings along the periphery of the top portion of the cylindrical cover.

A centrifugal fan is disposed within the top portion of the cylindrical cover. The centrifugal fan is driven by an electrical motor mounted within the cover. The centrifugal fan is surrounded by an air deflector dish mounted within the top portion of the cylindrical cover.

Operation of the centrifugal fan draws unpurified air within the vicinity of the air cleaner into the air inlet openings and through the wall of the cylindrical filter element. The passage of air through the filter element purifies the air. The purified air is drawn into the centrifugal fan and then forced radially outward therefrom. The radially directed purified air is redirected by the air deflector dish so that it flows through the exhaust openings in a direction perpendicular to the inlet flow.

BRIEF DESCRIPTION OF THE DRAWINGS

The invention will be further described, by way of example, with reference to the accompanying drawings, wherein.

DETAILED DESCRIPTION OF THE PREFERRED EMBODIMENTS

It should be noted that while the following description will be specifically in the context of a HEPA filter air cleaner, the invention is not so limited and is applicable to air cleaners using other types of filter media.

Figure 1:
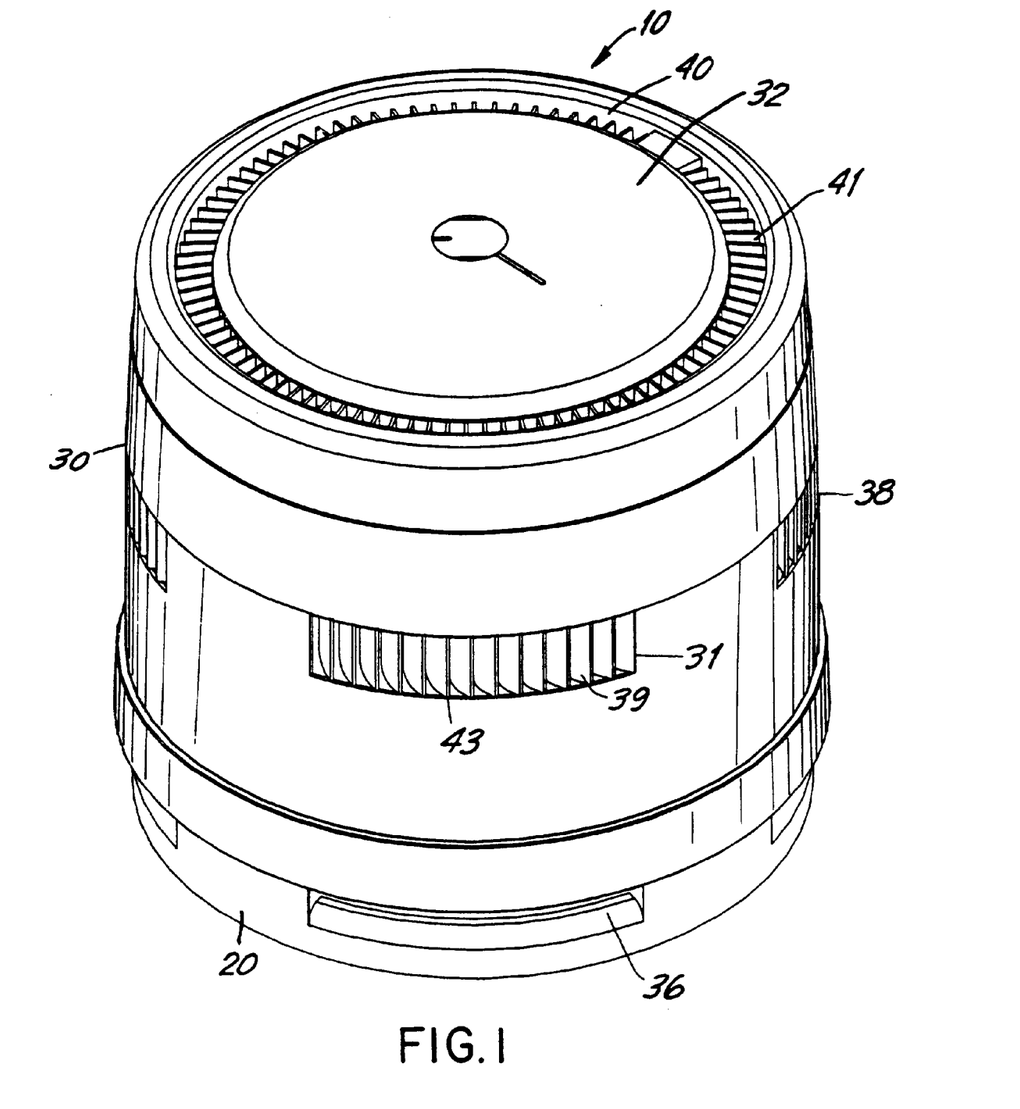
FIG. 1 is a perspective view of the HEPA filter air cleaner.
Figure 2:
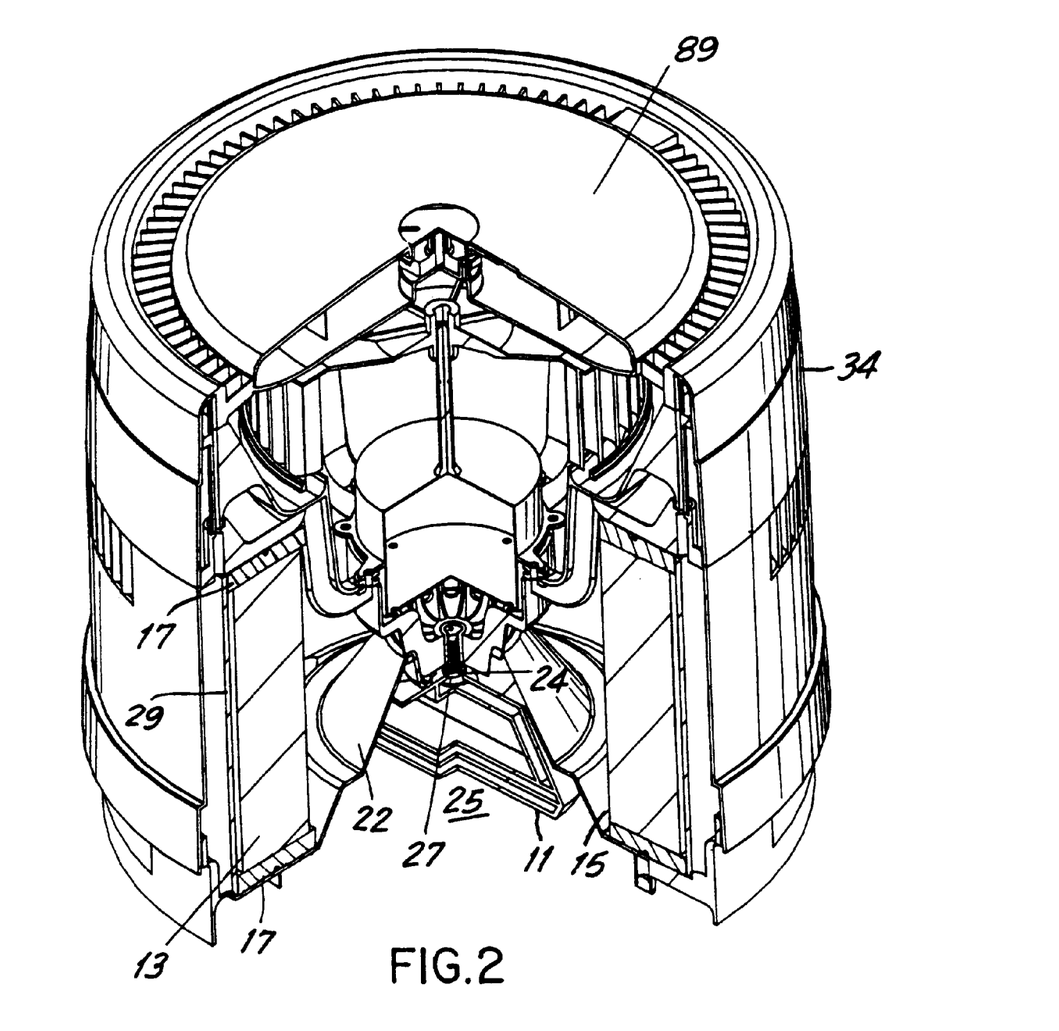
FIG. 2 is a cut-away view of the HEPA filter air cleaner as shown in FIG. 1.

Referring to FIGS. 1 and 2, air cleaner 10 comprises a HEPA filter element 15, a base 20 and a cover 30.

HEPA filter element 15 is a hollow cylinder in configuration and comprises HEPA pleated paper 13 and annular disks 17 disposed at the ends of the cylinder. The annular disks 17, which are preferably formed from an elastomer, maintain the HEPA paper 13 in a cylindrical configuration.

In a preferred embodiment, a removable prefilter element 29 may be wrapped around the outer cylindrical surface of HEPA filter element 15. Prefilter element 29 removes larger airborne particles from the air before such particles enter the HEPA filter element 15. More preferably, the prefilter element 29 is formed from an inexpensive medium such as a charcoal impregnated open cell foam. By reducing the number and size of particles retained by HEPA filter element 15, prefilter element 29 extends the useful life of the more expensive HEPA filter element 15.

Figure 3:
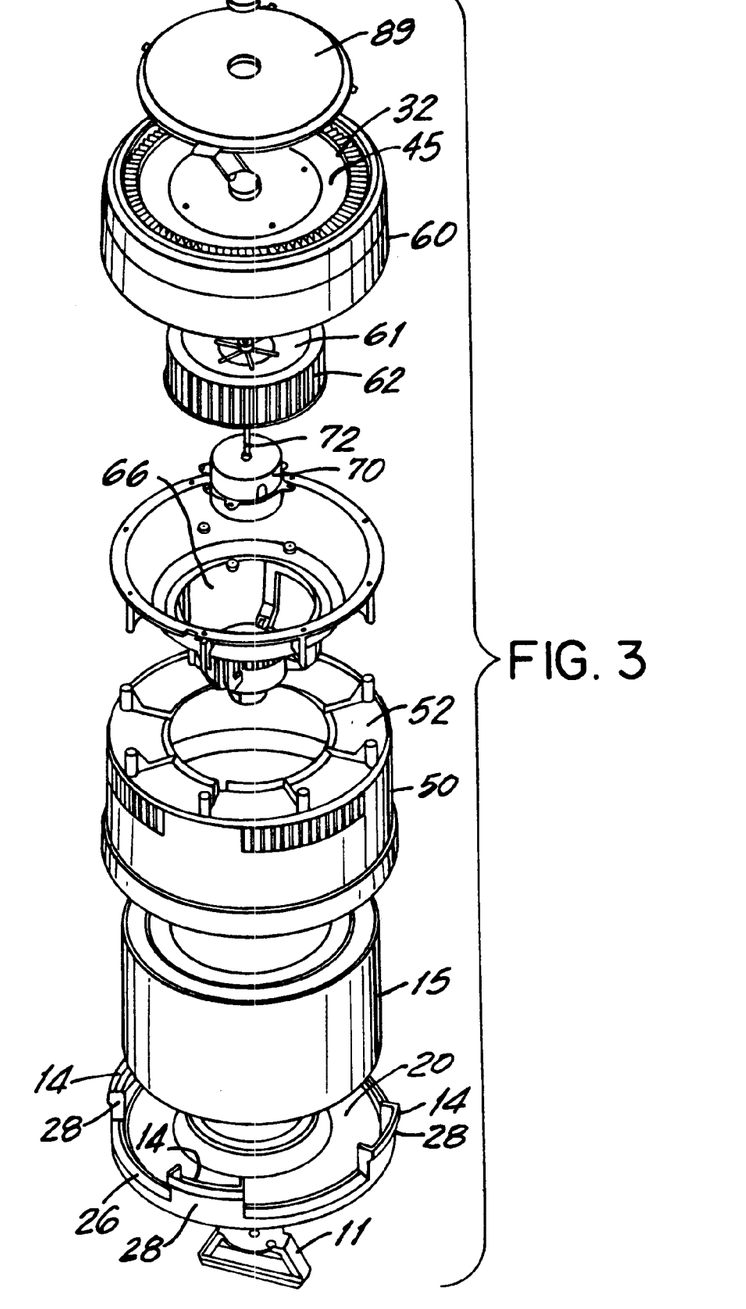
FIG. 3 is an exploded perspective view of the HEPA filter air cleaner.

Referring to FIGS. 2 and 3, base 20 is generally circular in configuration and has centrally disposed hollow, conical upwardly extending portion 22 having a hole 24 at the center of conical portion 22. The conical portion 22 forms a recess 25 in the bottom of base 20. An upwardly extending flange 26 extends around the circumference of the base 20. Four upwardly extending supporting tabs 28 are disposed along flange 26. An annular supporting shoulder 14 is disposed at the top portion of each supporting tab 28. Preferably, supporting tabs 28 are disposed equidistant to one another.

A locking handle 11 having a threaded portion 27 is disposed within recess 25 in the bottom of base 20. Preferably, locking handle 11 is tapered to correspond to the slope of conical portion 22 forming recess 25. An advantage of having locking handle 11 disposed on the underside of air cleaner 10 in recess 25 is that locking handle 11 is not readily accessible to small children, thereby rendering air cleaner 10 safer around small children.

The HEPA filter element 15 is mounted on the base 20 such that bottom annular disk 17 contacts the base 20 about the bottom surface of annular disk 17 and such that conical portion 22 extends upwardly within the hollow cylindrical HEPA filter element 15. Preferably, the radius of the base of conical portion 22 is about equal to the radius of the inner surface of HEPA filter element 15 so that the base of conical portion 22 nearly abuts the inner surface of HEPA filter element 15. HEPA filter element 15 is maintained in position on base 20 by flange 26 and conical portion 22.

Figure 4:
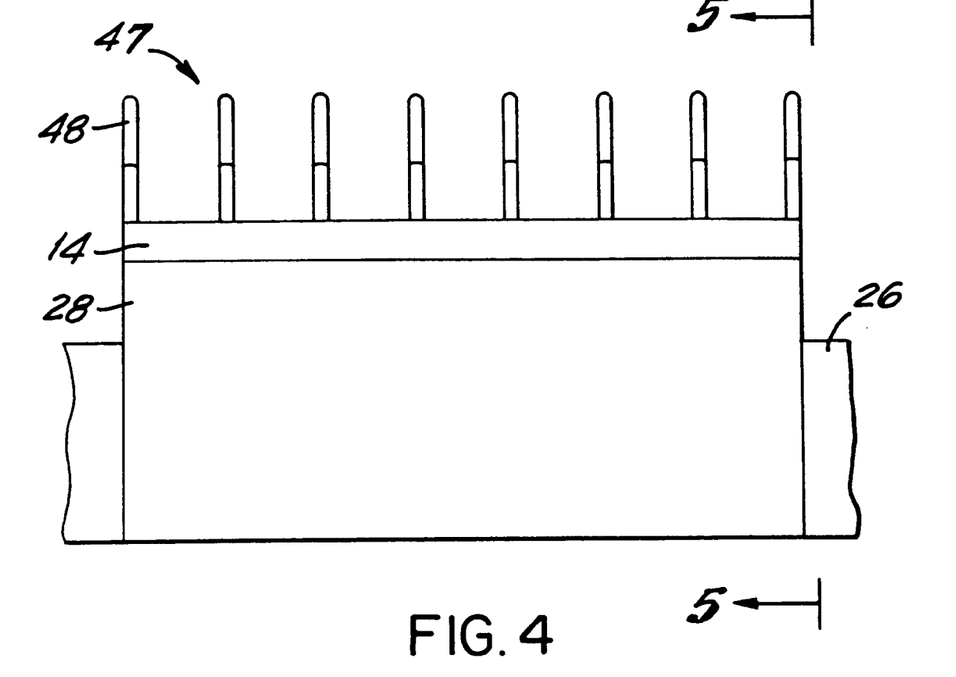
FIG. 4 is a front view of a portion of the base of the HEPA filter air cleaner.
Figure 5:
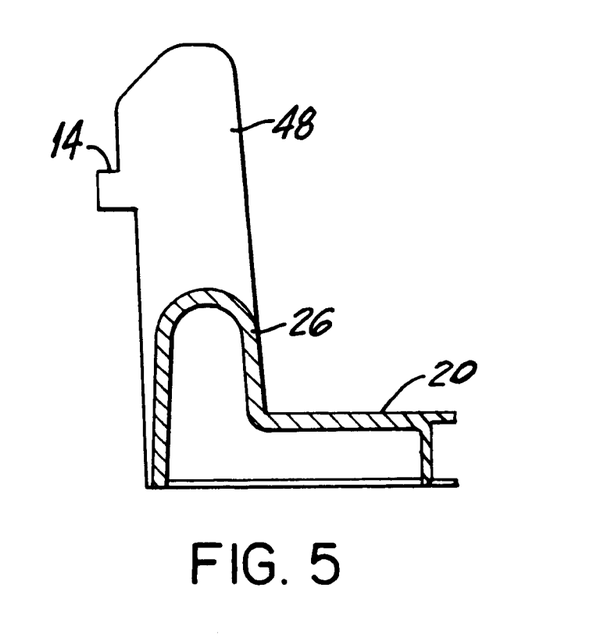
FIG. 5 is a cross-sectional view of the base of the HEPA filter air cleaner when viewed along line 5—5 in FIG. 4.

Cover 30 is generally cylindrical in configuration and comprises a circular top portion 32 and side wall 34 downwardly extending from circular top portion 32. Cover 30 is sized such that the side wall 34 will surround the HEPA filter element 15 and the bottom of side wall 34 will engage supporting shoulders 14 of upwardly extending supporting tabs 28. Referring to FIGS. 4 and 5, it is preferable that each support tab 28 has a centering member 47 which upwardly extends beyond supporting shoulder 14 and facilitates the engagement of the bottom edge of side wall 34 and supporting shoulders 14. Centering members 47 maintain cover 30 in position relative to base 20. Centering members 47 also assist in maintaining HEPA filter element 15 in position on base 20. More preferably, each centering member 47 comprises a plurality of centering fins 48, each of which has a cambered surface to facilitate the engagement of the bottom edge of side wall 34 and supporting shoulders 14.

Air inlet openings 36 are formed by the bottom of side wall 34 and those portions of base flange 26 between upwardly extending supporting tabs 28. Additional air inlet openings 38 may be disposed about the circumference of side wall 34. In a preferred embodiment, air inlet openings 38 are disposed at about mid-height of the cover 30 and comprises four segments 31 disposed equidistant about the circumference of side wall 34 wherein each segment comprises a plurality of discrete rectangular-shaped openings 39. Discrete rectangular-shaped openings 39 are defined by inlet fins 43. More preferably, inlet fins 43 are curved so as to direct air inlet flow towards HEPA filter element 15.

Figure 6:
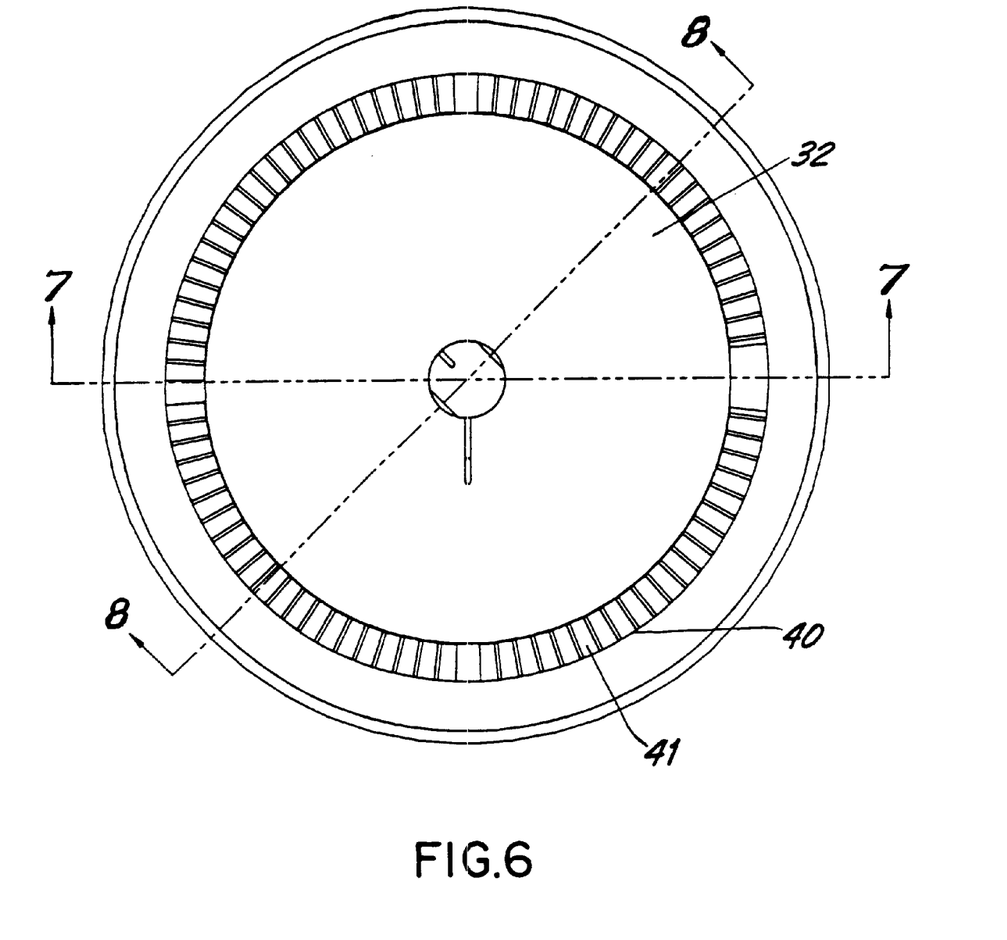
FIG. 6 is a top elevational view of the HEPA filter air cleaner.

Referring to FIG. 6, an exhaust opening 40 is disposed adjacent to the periphery of circular top portion 32. In a preferred embodiment, exhaust opening 40 comprises a plurality of discrete openings 41 disposed adjacent to the periphery of circular top portion 32. In a more preferred embodiment, discrete openings 41 are rectangular-shaped in configuration.

Thus, exhaust opening 40 is arranged perpendicular to air inlet openings 36 and 38. In the preferred embodiment, discrete exhaust openings 41 are spaced away from air inlet openings 38 by a distance of about half the height of cover 30. Exhaust flow through discrete exhaust openings 41 will be axially directed relative to air cleaner 10.

The flow characteristics of exhaust flow through exhaust openings 41, such as flow rate and turbulence, can be adjusted by varying the number of discrete openings 41 and the size of each discrete opening 41. For example, the turbulence of exhaust flow through rectangular-shaped discrete exhaust openings 41 may be reduced by decreasing the width of exhaust openings 41. A reduction in exhaust flow turbulence reduces the noise of air cleaner 10 during operation.

Referring to FIG. 3, cover 30 comprises a bottom portion 50 and a top portion 60. An annular supporting plate 52 is disposed within cover 30 and is integral with side wall 34. In a preferred embodiment, annular supporting plate 52 is formed unitary with side wall 34. Cylindrical bottom cover portion 50 is defined by side wall 34 and annular supporting plate 52 disposed at the top thereof. Cylindrical top cover portion 60 is defined by side wall 34 and circular top portion 32 disposed at the top thereof.

Figure 7:
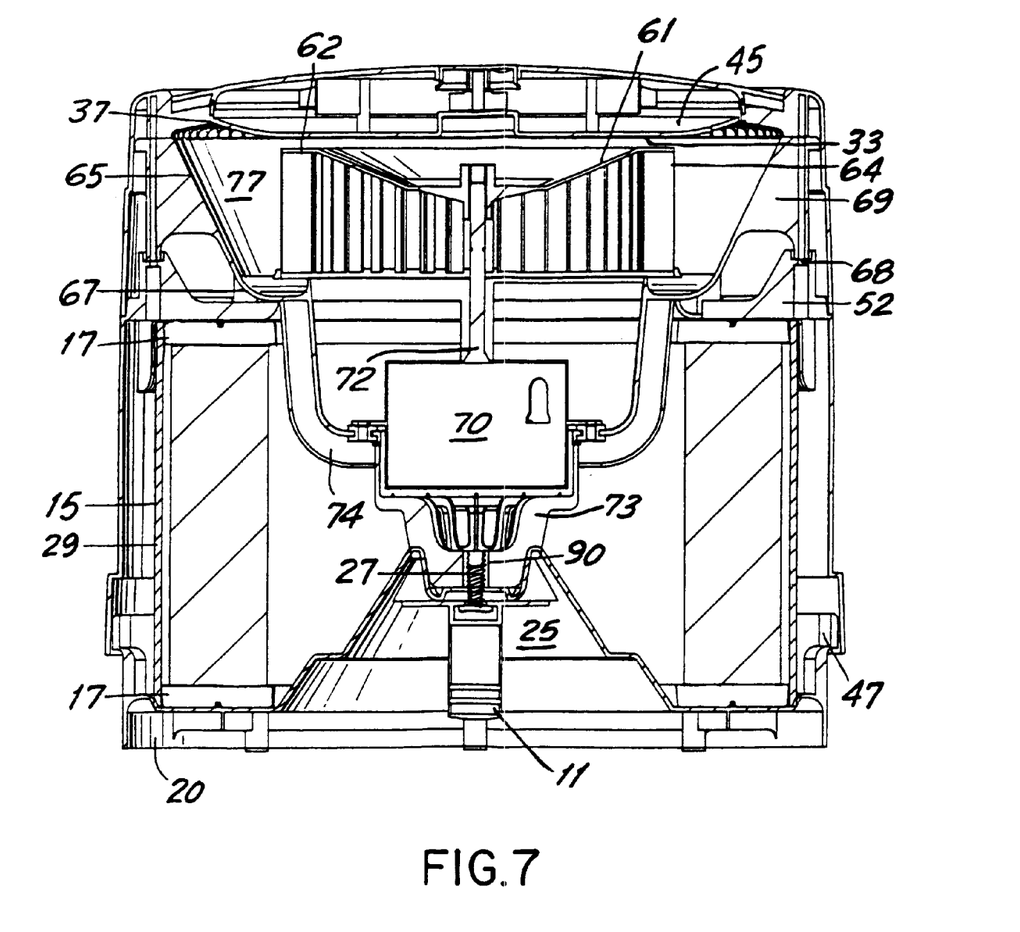
FIG. 7 is a cross-sectional view of the HEPA filter air cleaner when viewed along line 7—7 in FIG. 6.
Figure 8:
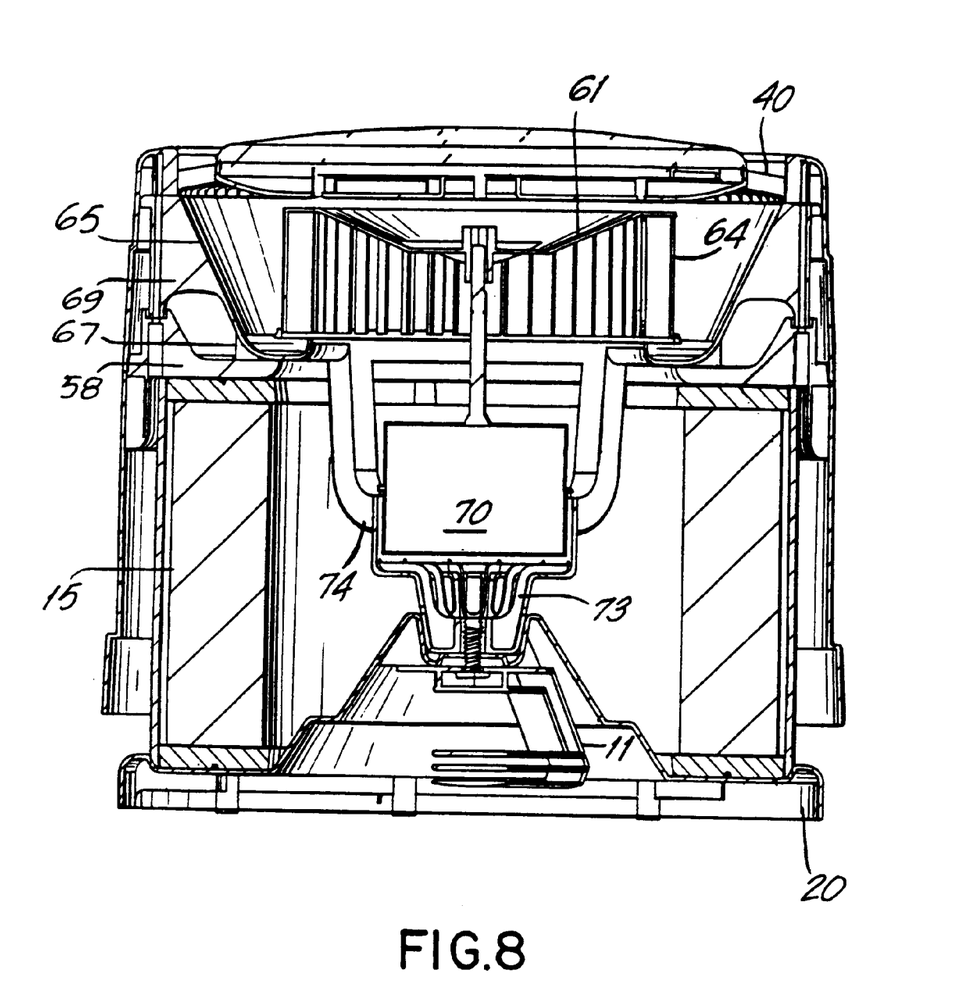
FIG. 8 is a cross-sectional view of the HEPA filter air cleaner when viewed along line 8—8 in FIG. 6 including dimensions stated in millimeters.
Figure 9:
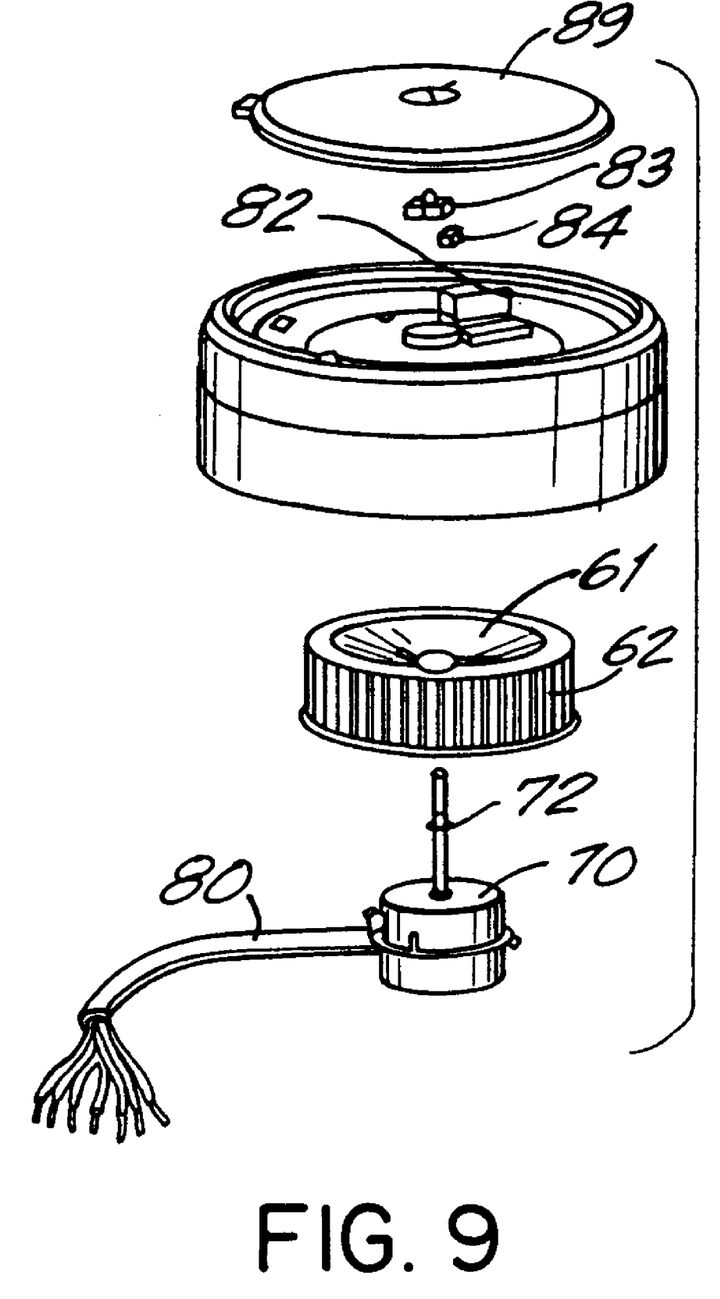
FIG. 9 is an exploded perspective view of a portion of the HEPA filer air cleaner.

Referring to FIGS. 3 and 7, a centrifugal fan 62, which comprises radially extending and equally spaced blades 64, is disposed in top cover portion 60. As shown in FIGS. 7 and 9, top surface 61 of centrifugal fan 62 is concave. The centrifugal fan 62 is encased by an air deflector dish 69 having an upwardly extending conical-shaped side wall 65, a curved-shaped bottom wall 67 and a central opening 66 allowing air flow through annular supporting plate 52 to centrifugal fan 62. Air deflector dish 69 is secured in position relative to centrifugal fan 62 by screws 68 affixing air deflector dish 69 to supporting plate 52. Conical side wall 65 extends beyond centrifugal fan blades 64. In a preferred embodiment, conical side wall 65 extends beyond centrifugal fan blades 64 with their respective heights in the representative dimensional proportional relationship depicted in FIG. 8. Referring to FIG. 8, conical side wall 65 terminates adjacent to the circular top portion 32 and is coextensive with exhaust opening 40.

Circular top portion 32 includes a concaved central portion 45 which is disposed radially inward of exhaust opening 40. Inside surface 33 of circular top portion 32 includes reflector 37 which is curved to correspond to the concavity of central portion 45. Curved reflector 37 and concaved top surface 61 of centrifugal fan 62 are substantially aligned to define a generally continuous conical air flow surface.

Exhaust chamber 77 is defined by conical-shaped side wall 65 and curved-shaped bottom wall of air deflector dish 69, exhaust opening 40 and curved reflector 37.

Centrifugal fan 62 is operatively connected to an electric motor 70 by a drive shaft 72. Electric motor 70 is mounted in a hub 73 which is disposed in the bottom cover portion 50 and located within supporting plate 52 by supporting members 74.

Referring to FIG. 9, electric supply means 80 supplies electric power to electric motor 70. Electric supply control means 82 includes an on/off switch 83 for controlling the supply of electric power to the motor. Electric supply control means 82 may also include an electric light bulb 84 which illuminates to indicate that electric power is being supplied to electric motor 70. An advantage of having electric motor 70 disposed in cover 30 is that electric supply control 82 means may be mounted on central portion 45 of circular top portion 32 for the user's convenience. For the user's safety, lid 89 may be provided to cover the electric supply control means 82.

In a preferred embodiment, electric motor 70 is a variable speed electric motor. In this preferred embodiment, on/off switch 83 includes additional positions corresponding the variable speeds of the electric motor.

Referring to FIG. 7, a threaded opening 90 is provided in hub 73 so as to threadingly receive threaded portion 27 of locking handle 25. The engagement of the threaded portion 27 of locking handle 25 within threaded opening 90 results in the cover 30 being drawn into a tightly fitted engagement with base 20. This engagement also results in supporting plate 52 being drawn into sealing engagement with annular disk 17 disposed at the top of HEPA filter element 15 and base 20 being drawn into sealing engagement with annular disk 17 disposed at the bottom of HEPA filter element 15.

In a preferred embodiment, the engagement of threaded portion 27 and threaded opening 90 results in a sealing engagement of supporting plate 52 and elastomeric annular disk 17 without hub 73 being in contact with conical portion 22. In this preferred embodiment, relatively heavy electric motor 70 is supported by supporting plate 52 which, in turn, is supported by elastomeric annular disks 17 and HEPA pleated paper 13. Vibrations caused by operation of electric motor 70 are transmitted to supporting plate 52 and absorbed by elastomeric annular disks 17 and HEPA pleated paper 13. An advantage of the invention of this preferred embodiment is that vibration and noise experienced during operation of air cleaner 10, that is attributable to electric motor 70, is significantly reduced, and also that resistance to shock, for example during shipping, is significantly increased.

Operation of centrifugal fan 62 causes unpurified air within the vicinity of side wall 34 to be drawn into air inlet openings 36 and 38 and through HEPA filter element 15. The passage of air through the HEPA filter element 15 removes particles of a size of 0.3 microns or larger at a minimum efficiency of 99.97%. The resulting purified air is drawn into centrifugal fan 62 and then forced radially outward therefrom into exhaust chamber 77. The radially directed purified air impinges on air deflector dish 69 and is redirected by conical-shaped side wall 65, curve-shaped bottom wall 67 and curved reflector 37 so that it flows through exhaust opening 40 in a direction perpendicular to the inlet flow.

In a preferred embodiment, the width of exhaust opening 40 is limited to a width in a representative dimensional proportional relationship to the height of centrifugal fan blades 64 as depicted in FIG. 8. This preferred width of exhaust opening 40 reduces the turbulence of the flow through exhaust opening 40, and thereby reduces the noise of air cleaner 10 during operation.

The above-described structure significantly improves the aerodynamic characteristics of air cleaner 10 over that of other air cleaners. First, exhaust chamber 77 is defined by curved surfaces only and contains no corners. This configuration improves air flow efficiency and reduces noise. Second, conical portion 22, which upwardly extends within HEPA filter element 15, directs air drawn through HEPA filter element 15 upwards towards centrifugal fan 62. In this manner, conical portion 22 reduces the noise of air cleaner 10 during operation and improves its efficiency.

In accordance with the invention, base 20, which is preferably molded from a plastic material, is devoid of electrical circuitry. This feature is particularly advantageous when it becomes necessary to replace a dirty prefilter or filter element. Specifically, after a long period of operation of air cleaner 10, prefilter element 29 and/or HEPA filter 15 will become clogged with particles and will require replacement. During removal of the prefilter element 29 and/or HEPA filter 15, particles, dirt, dust and the like will fall from the prefilter element 29 and/or HEPA filter 15 and will be contained in base 20 between flange 26 and conical portion 22. Because all electrical components are carried by cover 30, the debris does not fall onto electrical components, thus avoiding fouling of the circuitry. Moreover, because base 20, with flange 26, provides a container for the falling debris, base 20 can be easily carried to a trash bag, emptied and then washed in a sink.

A further advantage of the above-described invention is that an exhaust flow that is perpendicular to and spaced away from the inlet openings will not result in an immediate recirculation of the exhausted purified air into the air cleaner. This flow pattern results in an increased efficiency in purifying the complete volume of air within a room.

A further advantage of the above-described invention is that the upwardly exhausted purified air results in an increased dispersion of the purified air throughout the room. This upwardly directed flow pattern avoids direct blowing of purified air on nearby people and furniture.

A further advantage of the above-described invention is that the exhausted purified air does not directly impinge on the flooring on which the air cleaner is placed. Where an air cleaner is placed on a carpeted flooring, radially directed exhaust flow that impinges the carpet will disperse particles previously deposited within the carpet into the air, and thereby temporarily worsening the air quality.

Having described the invention in specific detail and exemplified the manner in which it may be carried into practice, it will now be readily apparent to those skilled in the art that innumerable variations, applications, modifications and extensions of the basic principles involved may be made without departing from its sphere or scope.

What is claimed is:

1. A portable air cleaner comprising:
    a base having a centrally disposed opening;
    a top cover portion having a threaded opening;
    a filter element disposed between said base and said top cover portion;
    a side wall portion disposed between said base and said top cover portion, said side wall portion surrounding said filter element, and said side wall portion defining an air inlet opening therein;
    an air exhaust opening disposed above said air inlet opening relative to said base;
    a fan disposed between said base and said top cover portion;
    a motor disposed between said base and said top cover portion, and engagable with said fan so that said fan draws air into said air inlet opening, through said filter element, and exhausts said air through said air exhaust opening; and
    a locking member having a threaded portion extending through said opening in said base and engagable with said threaded opening in said top cover portion for disengageably securing said base to said top cover portion.

2. The portable air cleaner defined in claim 1 wherein said base is devoid of electrical components and electric circuitry.

3. The portable air cleaner defined in claim 2 wherein said filter element is cylindrical.

4. The portable air cleaner defined in claim 3 wherein said filter element is a cylindrical HEPA filter element.

5. The portable air cleaner defined in claim 4 where said top cover portion is round and said side wall portion is cylindrical.

6. The portable air cleaner defined in claim 5 wherein said side wall portion is integral with said top cover portion.

7. The portable air cleaner defined in claim 6 wherein said air exhaust opening is defined in said top cover portion and oriented perpendicular to said air inlet opening.

8. The portable air cleaner defined in claim 7 wherein said top cover portion defines said air exhaust opening adjacent to the periphery of said top cover portion.

9. A portable air cleaner comprising:

a base;

a top cover portion, said top cover portion defining a plurality of exhaust openings therein, and said plurality of air exhaust openings arranged in a substantially circular ring;

a filter element disposed between said base and said top cover portion;

a side wall portion disposed between said base and said top cover portion, said side wall portion surrounding said filter element, and said side wall portion defining an air inlet opening therein perpendicular to said air exhaust openings;

a centrifugal fan disposed between said base and said top cover portion;

a drive mechanism disposed between said base and said top cover portion adapted to drive said centrifugal fan so that said centrifugal fan draws air into said air inlet opening, through said filter element, and disperses said air radially outward from said centrifugal fan; and an air deflector disposed between said base and said top cover portion for redirecting said air dispersed radially outward from said centrifugal fan to a direction generally perpendicular to said centrifugal fan and through said air exhaust openings.

10. The portable air cleaner defined in claim 9 wherein the drive mechanism comprises an electric motor and drive shaft.

11. The portable air cleaner defined in claim 10 wherein said base is devoid of electrical components and electric circuitry.

12. The portable air cleaner defined in claim 11 wherein said filter element is cylindrical.

13. The portable air cleaner defined in claim 12 wherein said filter element is a cylindrical HEPA filter element.

14. The portable air cleaner defined in claim 13 wherein said top cover portion is round and said side wall portion is cylindrical.

15. The portable air cleaner defined in claim 14 wherein said plurality of air exhaust openings are arranged in a substantially circular ring having an outer diameter disposed at about the outer edge of said round top cover portion.

16. The portable air cleaner defined in claim 15 wherein said plurality of air exhaust openings are arranged in a substantially circular ring having an inner diameter disposed at about the outer edge of said centrifugal fan.

17. The portable air cleaner defined in claim 16 wherein said side wall portion is integral with said top cover portion.

18. The portable air cleaner defined in claim 17 wherein said plurality of exhaust openings are arranged in a substantially circular ring disposed in a plane substantially parallel to said base.

19. A portable air cleaner comprising:

a circular base having a centrally disposed opening;

a cover housing disposed over said base, said cover housing defining an air inlet opening and an air exhaust opening therein, and said air exhaust opening disposed above said air inlet opening;

a cylindrical HEPA filter element mounted on said base, and said cylindrical HEPA filter element encased by said cover housing;

a centrifugal fan disposed within said cover housing;

a motor disposed within said cover housing and affixed to said cover housing by a supporting assembly having a threaded opening, said motor engageable with said centrifugal fan so that said centrifugal fan draws air into said air inlet opening through said cylindrical HEPA filter element, and exhausts said air radially outward from said centrifugal fan;

an air deflector disposed in said cover housing, said air deflector having an opening formed therein to permit air flow to said centrifugal fan, said air deflector further encasing said centrifugal fan so that said air dispersed radially outward from said centrifugal fan is redirected through said air exhaust opening; and a locking member having a threaded portion extending through said opening in said base and engageable with said threaded opening in said supporting assembly for disengageably securing said base to said cover housing.

20. The portable air cleaner defined in claim 19 wherein said cylindrical HEPA filter element comprises HEPA pleated paper and two annular disks formed from an elastomeric material.

21. The portable air cleaner defined in claim 19 wherein said locking member has a a handle affixed to said threaded portion.

22. A portable air cleaner comprising:

a base having a centrally disposed opening;

a top cover portion;

a filter element disposed between said base and said top cover portion;

a side wall portion disposed between said base and said top cover portion, said side wall portion formed unitary with said top cover portion and surrounding said filter element, and said side wall portion defining an air inlet opening therein;

an air exhaust opening disposed above said air inlet opening relative to said base;

a fan disposed between said base and said top cover portion;

a motor disposed between said base and said top cover portion and affixed to said side wall portion by a supporting assembly having a threaded opening, said motor engagable with said fan so that said fan draws air into said air inlet opening, through said filter element, and exhausts said air through said air exhaust opening; and a locking member comprising a threaded portion which extends through said opening in said base and is engagable with said threaded opening in said supporting assembly for disengageably securing said base to said top cover portion, and a handle affixed to said threaded portion.

* * * * *